United States Patent
Wang et al.

(10) Patent No.: US 9,877,169 B1
(45) Date of Patent: Jan. 23, 2018

(54) MULTI-PERIOD ASSIGNMENT OPTIMIZATION USING DYNAMIC PRIORITY UPDATING

(71) Applicant: SAP SE, Walldorf (DE)

(72) Inventors: Mengjiao Wang, Shanghai (CN); Yu Cheng, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/383,628

(22) Filed: Dec. 19, 2016

(51) Int. Cl.
*H04B 5/00* (2006.01)
*H04W 4/08* (2009.01)
*H04W 4/10* (2009.01)

(52) U.S. Cl.
CPC .............. *H04W 4/08* (2013.01); *H04W 4/10* (2013.01)

(58) Field of Classification Search
USPC ......................................... 455/518, 450–455
See application file for complete search history.

(56) References Cited

U.S. PATENT DOCUMENTS

| | | | |
|---|---|---|---|
| 6,275,812 B1 | 8/2001 | Haq et al. | |
| 6,321,207 B1 * | 11/2001 | Ye | G06Q 10/06315 705/7.25 |
| 6,661,889 B1 | 12/2003 | Flockhart et al. | |
| 7,480,913 B2 * | 1/2009 | Buco | G06F 9/4887 718/105 |
| 2003/0013451 A1 * | 1/2003 | Walton | H04W 16/04 455/447 |
| 2006/0106675 A1 | 5/2006 | Cohen et al. | |
| 2008/0052219 A1 * | 2/2008 | Sandholm | G06Q 30/08 705/37 |
| 2008/0244605 A1 | 10/2008 | Bennington et al. | |
| 2008/0294504 A1 | 11/2008 | Mortensen et al. | |
| 2010/0010859 A1 | 1/2010 | Ratakonda et al. | |
| 2011/0184771 A1 | 7/2011 | Wells | |
| 2013/0066944 A1 | 3/2013 | Laredo et al. | |
| 2013/0289945 A1 * | 10/2013 | Ball | G06F 17/50 703/1 |
| 2014/0095236 A1 | 4/2014 | Podgurny et al. | |
| 2014/0122143 A1 | 5/2014 | Fletcher et al. | |

* cited by examiner

*Primary Examiner* — Fayyaz Alam
(74) *Attorney, Agent, or Firm* — Brake Hughes Bellermann LLP (57) ABSTRACT

Software techniques are described for optimizing resource assignments among assignees of those resources, by using dynamic priority updating over a plurality of rounds of resource assignment. In particular, in example implementations, a greedy algorithm is used to optimize the resource assignments over multiple rounds based on ranked selections within each selection set of each assignee, including dynamically updating the priority of the assignees at each round, based on assignment results from one or more preceding assignment rounds.

20 Claims, 5 Drawing Sheets

| Assignee 402 | Optimization Value 404 | Old Priority 406 | New Priority 408 |
|---|---|---|---|
| 1 | n - 1 | 4 | 4 + 0 |
| 2 | n - 1 | 3 | 3 + 0 |
| 3 | n - 1 | 2 | 2 + 0 |
| 4 | n - 1 | 2 | 2 + 0 |
| 5 | n - 1 | 1 | 1 + 0 |
| 6 | n - 1 | 1 | 1 + 0 |
| 7 | - | 0 | 0 + n |

MULTI-PERIOD ASSIGNMENT OPTIMIZATION USING DYNAMIC PRIORITY UPDATING

TECHNICAL FIELD

This description relates to data analysis for resource assignment optimization.

BACKGROUND

High volumes of data are captured, stored, and available for use in various types of decision-making. However, it is often difficult or impossible for human users of such data to apply the data, and/or to engineer computers to operate based on the data and in a manner that optimizes use of the available data.

Computers are often used in various types of scheduling operations, and many such scheduling operations are straightforward, whether by computer or human implementation. In some contexts, however, it is difficult or impossible to make large-scale, accurate, and/or timely scheduling decisions, particularly when certain scheduling constraints exist (such as schedule conflicts), and/or when a large number of scheduling variables are present.

For example, it is difficult to assign available, finite resources among a number of users of those resources, particularly when the resources are only available at pre-determined times, and to pre-determined extents. In particular, potential users or other consumers of the resources are often also subject to their own availability constraints, which may also overlap or conflict with other users in terms of utilizing or accessing the resources. Further, users also may have strong needs or preferences to obtain some of the resources, while not desiring or needing (or wishing to avoid) other ones of the resources.

Consequently, even if it is possible to find a resource/user assignment(s), that satisfies the relevant resource constraints, the resulting assignment(s) may be very unsatisfactory to individual users who receive unwanted or unnecessary resources. Further, in some scenarios, there may be a wide disparity between some users who receive desired resources and are very satisfied, and other ones of the users who receive very few, if any, desired resources.

SUMMARY

In the present description, software techniques are described for optimizing resource assignments among assignees (e.g., consumers or other users) of those resources, by using dynamic priority updating over a plurality of rounds of resource assignment. In particular, in example implementations, a greedy algorithm is used to optimize the resource assignments over multiple rounds based on ranked selections within each selection set of each assignee, including dynamically updating the priority of the assignees at each round, based on assignment results from one or more preceding assignment rounds. In this way, overall resource assignment results may be optimal or near optimal, even when calculating a large and/or complex resource assignment. Moreover, each assignee is likely to obtain a relatively high level of success or satisfaction even in scenarios in which most-desired resources can not be assigned for that assignee (i.e., a lower bound of success or satisfaction is maximal, or near maximal). Further, the spread or range between a lowest and highest level of satisfaction among all included assignees may be minimal, or near minimal.

The details of one or more implementations are set forth in the accompanying drawings and the description below. Other features will be apparent from the description and drawings, and from the claims.

DETAILED DESCRIPTION

Figure 1:
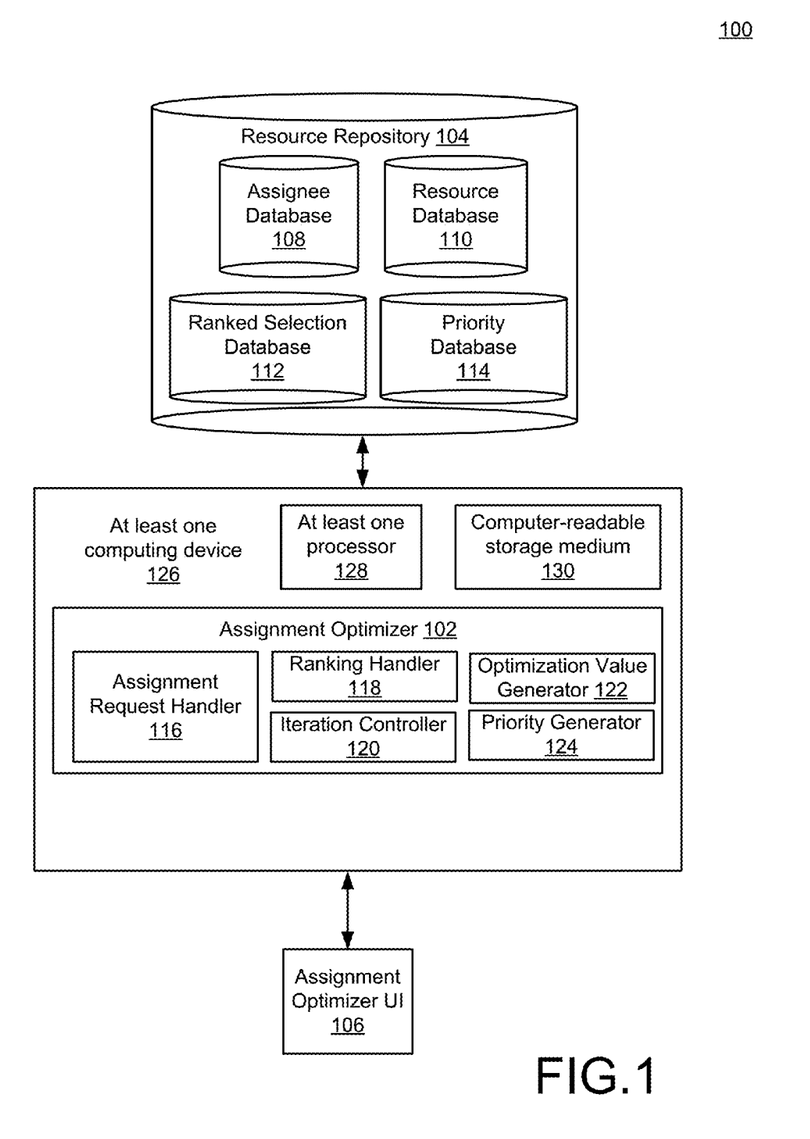
FIG. 1 is a block diagram of a system for multi-period assignment optimization using dynamic priority updating.

FIG. 1 is a block diagram of a system for multi-period assignment optimization using dynamic priority updating. In the example of FIG. 1, an assignment optimizer 102 is configured to process data stored within a resource repository 104, in order to provide assignment optimization in which a plurality of tasks are assigned to a plurality of assignees over a plurality of assignment rounds, subject to one or more constraints, and utilizing dynamic priority updating at each assignment round for each assignee. A resulting assignment schedule may be provided, e.g., using one or more assignment optimization user interface(s) (UI) 106. In this way, for example, an overall satisfaction as well as a lower bound of satisfaction of all of the assignees may be maximized or nearly maximized, while a difference level or spread of satisfaction levels among the assignees may be minimized.

In the example of FIG. 1, as referenced above, it is assumed that the system 100 is implemented in, or in conjunction with, an environment in which resources are to be assigned in an iterative manner and over a plurality of rounds of assignments, and/or other related context(s). For example, in many of the example scenarios provided below, the system 100 may be implemented in conjunction with assignment of classes to students in an academic setting. In other examples, workstations or other resources at a manufacturing or other facility may be assigned among a plurality of employees. Such facilities may include any facility in which one or more types of physical goods are constructed, assembled, manufactured, or otherwise provided or produced, as well as scenarios in which services are provided instead of (or as well as) physical goods. Accordingly, relevant contexts should be understood to represent or include, e.g., academic, factory, warehouse, or retail contexts, to provide a few, non-limiting examples.

As also referenced above, it is assumed that various quantities and types of resources are available and utilized in the corresponding type of environment, and that one or more options are available for assigning these resources among the plurality of potential assignees who might consume and/or otherwise utilize the resources. For example, the assignees might include individuals or groups of persons who desire resource access, or the assignees might include locations to which a physical resource might be moved or implemented, and/or automated resources configured to perform one or more designated tasks. Accordingly, the resource repository 104 illustrates an assignee database 108 that may be configured to store data enumerating and characterizing the types of assignee data just referenced, and other relevant types of assignee data. More detail regarding example implementations of the assignee database 108 is provided below, but, in general, it will be appreciated that the assignee database 108 may be configured to store individual student or employee data records, or data records storing information regarding a corresponding location or physical resource that might be assigned to some other resource. For example, a student or employee data record may include a name or other biographical data, as well as relevant background academic or employment background, as would be appropriate.

Meanwhile, a resource database 110 may be configured to store all available resources to be assigned, including, e.g., training programs, classes, online learning, mentorships, or any other available program or activity that may be available to one or more of the assignee stored using the assignee database 108. More generally, when the assignee database includes individual students or employees, resources of the resource database 110 may include tasks to be performed by the students/employees, such as classes, as just referenced. Similar comments would apply when the resource database 110 includes locations, workstations, or other physical resources to be assigned. For example, during maintenance or upgrade operations for machines, associated tools, workers, or other resources may be assigned to execute the relevant operations. In other examples, computing resources (e.g., processing/memory resources) may be assigned and scheduled for execution of pre-defined computing tasks.

Further, as discussed in more detail below, the resource database 110 may contain data characterizing each resource, including data characterizing a current state of the resource, which may be updated as assignment rounds are executed and/or completed. For example, each resource may have a finite capacity that is gradually exhausted as assignments are made, such as when classes are gradually filled as students are assigned. In these cases, the resource database 110 may be used to designate the current status as exhausted or not (e.g., open or closed), as well as to store a current level or capacity that has been reached during an ongoing or previous assignment round(s).

In the example of FIG. 1, it is assumed that each of the assignees of the assignee database 108 will provide, or be associated with, a ranked selection of relevant ones (i.e., a designated subset) of the individual resources of the resource database 110. In FIG. 1, these ranked selections are illustrated as being stored using a ranked selection database 112.

For example, when the assignee database 108 includes individual students, and the resource database 110 includes individual classes, each student may provide a ranking of a designated number/subset of his or her most preferred classes, in a ranked manner, such as by designating three individual classes in order as first, second, third-most preferred. In other scenarios, such as when the assignee is a location or an object, then an administrator may assign the ranked selection(s). In still other scenarios, the rankings may be generated automatically, based on designated criteria and using a specified algorithm.

Then, just as each assignee is associated with a ranked selection subset of resources, each assignee may similarly be associated with a priority level designating a current relative likelihood of the assignee receiving one or more of the ranked selection subset of resources for that assignee during a current round of assignments. These priority rankings may be stored, as shown, within a priority database 114, and may be updated for each round, based at least in part on assignment results of one or more preceding assignment round(s).

As already referenced, it is possible to assign human, machine, or other resources using various metrics or techniques. For example, resources may be assigned on a first-come first-serve basis. For example, students or employees having seniority may be assigned first to available classes or training programs. However, as referenced above, such simplified techniques can not generally give sufficiently full consideration to associated costs, benefits, and other relevant constraints and considerations. In particular, for a given number N of resources and a given number of M of potential assignees (e.g., N classes and M students), a number of possible relationships between resources and assignees grows in a non-linear fashion. Consequently, finding an optimized number and type of such relationships becomes a non-polynomial (NP) hard problem that is beyond a human capability of solving in any practical manner or timeframe, or with any acceptable degree of reliability, particularly when considering the need to meet the associated selection rankings of the assignees.

In contrast, the resource optimizer 102 may be configured to execute machine learning techniques for exploring a potentially vast solution space of potential relationships between resources and assignees, while considering the various constraints and characteristics associated therewith. In the example of FIG. 1, as just referenced, in operation, the resource optimizer 102 is configured to execute optimization activities in determining relationships between resources and assignees, while considering various associated constraints and other factors. Details regarding example implementations of the various databases 108-114, including example formats and structures for the data stored therein, are provided below.

In the present context, the term optimization (or optimized, or similar) should be understood to refer to a process by which potential relationships and associated assignments for available resources and potential improvement activities are iteratively calculated and evaluated by the resource optimizer 102 over a plurality of rounds of assignment, in which the iterative calculations (over a sufficient number of rounds) generally result in progressively improving results, where such improvements can be quantified, measured, and evaluated. Such optimization does not necessarily result in a single best solution, or guarantee that a single, current calculation is necessarily an improvement over a preceding calculation. Nonetheless, as described herein, operations of the resource optimizer 102 ultimately provide a resource/assignment optimization that represent(s) substantial and quantifiable improvements (e.g., as measured in terms of assignee satisfaction, revenue production, resource efficiency, or other metric(s)), as compared to existing techniques. Moreover, such optimizations may be determined more quickly, more easily, and more reliably.

In operation, the resource optimizer 102 utilizes an assignment request handler 116 that is configured to receive parameters, perhaps from the assignment optimizer UI 106, characterizing an assignment operation to be performed. For example, the assignment request handler 116 may receive a specified set of assignees to be retrieved from the assignee database 108, as well as corresponding resources to be access from resources database 110 and assigned.

A ranking handler 118 may be configured to receive selection rankings used to populate the ranked selection database 112. In some implementations, the rankings may be received in conjunction with the received assignment request. In other implementations, the rankings may have been received at an earlier time, such as during an earlier set of assignment rounds/iterations. Further, it may be possible to change the selection rankings over time, such as when a student changes class selection rankings during a current semester, as compared to an earlier semester.

An iteration controller 120 may be configured to control a number and execution of a plurality of assignment rounds or iterations associated with a particular, received assignment request. For example, as described in detail below, the iteration controller 120 may be configured to initialize or initiate a first round of assignments, coordinate execution of an optimization value generator 122 and a priority generator 124 as described below during each round of assignments, and ultimately determine whether and when to cease operations associated with a current assignment request.

In particular, an optimization value generator 122 may be configured to calculate an optimization value characterizing a relative success level of a current assignment operation for a particular assignee, where a current value of an optimization value for each assignee may be updated and stored, e.g., within the assignee database 108, or within a separate database. For example, the optimization value may be reflective of, or include, a determined or inferred satisfaction (or dissatisfaction) level of a specified assignee, and/or may reflect a calculated business value, such as revenue/profit, or other appropriate metric. In general, as described below, it will be appreciated that the optimization value for a particular assignee may be proportional to a number of rounds that the particular assignee does not receive a resource that is highly-ranked by the particular assignee. For example, the higher the number of rounds that passes without the assignee receiving a preferred resource, the higher a dissatisfaction level of the assignee is likely to occur.

Then, the priority generator 124 may be configured to determine, and dynamically update at each round, a priority value associated with each assignee, where the priority value may be determined based at least in part on a previously-calculated optimization value for that assignee. For example, an initial priority value for each assignee may be set to a default value, and/or may be set based on a priority value(s) calculated during execution of one or more preceding assignment requests. Each priority value for each assignee may then be calculated and updated as needed within the priority database 114, in conjunction with a corresponding round or iteration of assignments, and based on the relevant optimization value calculations. For example, as described below, a priority value associated with a given assignee within the priority database 114 may be increased each time the assignee is not assigned to its most highly-ranked resource during an assignment operation, or may be maintained or decreased when the assignee is assigned to its most highly-ranked resource during an assignment operation.

The iteration controller 120 may continue to execute iterations of assignments of resources/assignees, according to the one or more dynamically-updated priority values, until one or more stop conditions are met. For example, such stop conditions may include satisfaction of one or more resource constraints. For example, where the resources include classes to be assigned, each class may be associated with a maximum number (capacity) of students, and a particular resource (e.g., class) may be closed during a particular round or iteration of assignments, if its capacity is reached during that round. Other stop conditions might include completion of assignments of all ranked selections of a designated set of assignees (e.g., all students receive all ranked classes), or conditions such as a reaching of an aggregate optimization value for all relevant assignees, or going below a designated floor, or above a designated spread, of optimization values within the set of assignees as a whole.

As described below, at each iteration or round, the priority generator 124 may be configured to utilize the associated optimization value for each assignee, as received from the optimization value generator 122, to update a priority value of an associated assignee. Accordingly, as referenced above and described in detail below, an assignee who goes through multiple rounds without receiving preferred (e.g., highly-ranked) resources, will be associated with a changing optimization value that is itself associated with a changing priority value. Consequently, as the number of rounds increases in such scenarios, the corresponding assignee will receive a higher priority value, and will thus become more likely to receive corresponding, highly-ranked resources.

In the example of FIG. 1, the assignment optimizer 102 is illustrated as being executed using at least one computing device 126, which itself includes at least one processor 128 and a non-transitory computer readable storage medium 130. For example, the at least one computing device 126 may represent one or more computing devices operating in parallel, perhaps in communication over a public or private computer network. For example, in such cases, various components of the assignment optimizer 102 may be executed on different ones of the two or more computers. For example, the optimization value generator 122 and/or priority generator 124 may be executed at a local computer in conjunction with providing the assignment optimization UI 106, while the remaining components of the assignment optimizer 102 may be implemented at a backend or cloud-based server computer.

Somewhat similarly, the at least one processor 128 may be understood to represent two or more processors potentially operating in parallel. For example, various operations of the iteration calculator 120 may be executed in parallel using two or more processors. For example, each of the two or more such processors may be assigned a subset of assignment relationships for which a corresponding optimization variable may be calculated, so that, for example, a total value of the optimization variable for the selected set may be determined more quickly.

The computer readable storage medium 130 may be understood to represent any known or future non-transitory computer readable storage medium suitable to store instructions that are executable by the at least one processor 128 for providing the various features and functions of the assignment optimizer 102 described herein. Further, although shown separately in the simplified example of FIG. 1, the resource repository 104 may be understood to be stored using one or more examples of such non-transitory computer readable storage medium. For example, it may be appreciated in the context of a large corporation or enterprise that the various databases 108-114 of the resource repository 104 may be stored at different locations and accessible by way of appropriate computer network. In this way, it will be appreciated that the assignment optimizer 102 is configured to leverage availability of existing data within such a corporation or enterprise, in order to provide assignment optimizations that can be shown to increase satisfaction levels, profitability, and/or other operational aspect of the corporation or enterprises, so that available resources are utilized and deployed effectively and efficiently.

Figure 2:
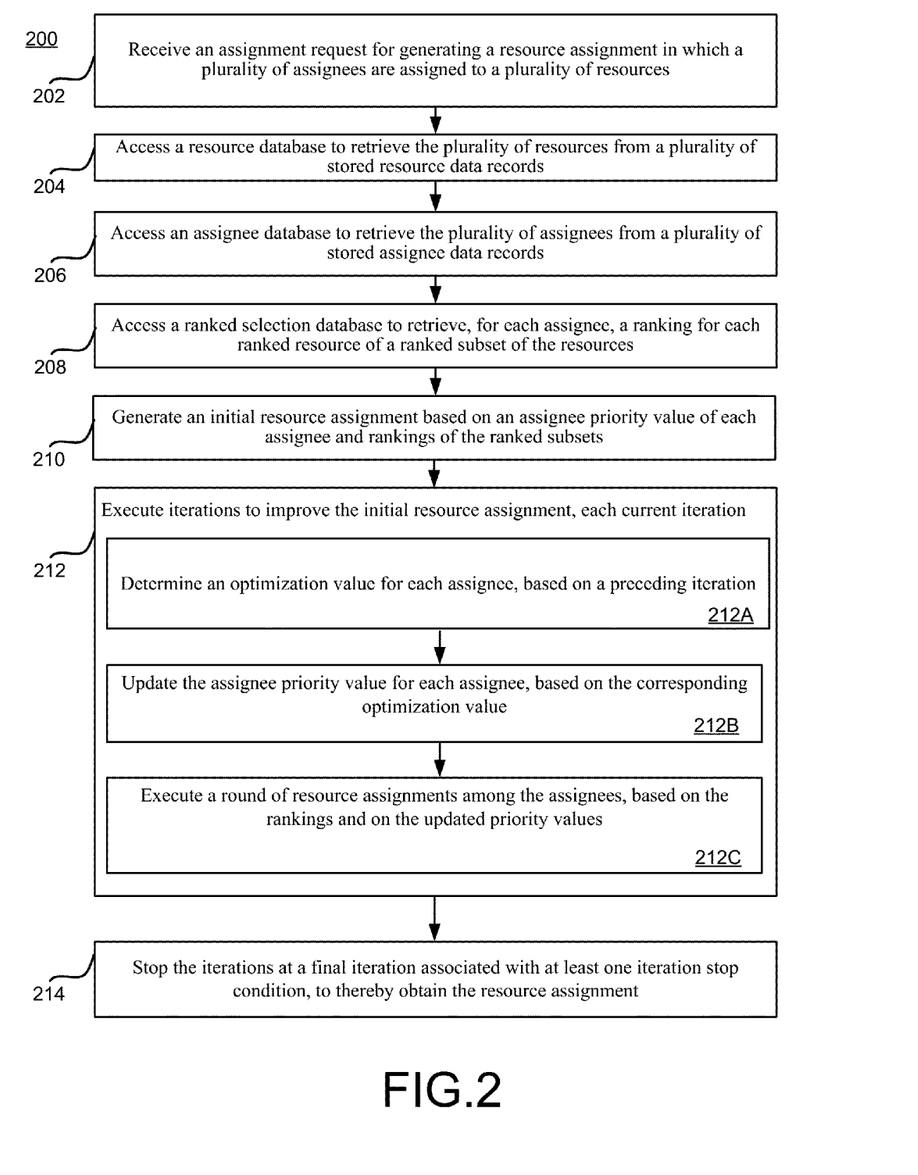
FIG. 2 is a flowchart illustrating example implementations of the system of FIG. 1.

FIG. 2 is a flowchart 200 illustrating example operations of the system 100 of FIG. 1. In the example of FIG. 2, operations 202-214 are illustrated as separate, sequential operations. However, in various implementations, it will be appreciated that additional or alternative operations or sub-operations may be included, and/or that one or more operations or sub-operations may be omitted. In all such implementations, it may occur that any two or more of the operations or sub-operations may be executed in a partially or completely overlapping or parallel manner, or in a nested, iterative, looped, or branched fashion.

In the example of FIG. 2, an assignment request is received for generating a resource assignment in which a plurality of assignees are assigned to a plurality of resources (202). For example, the assignment request handler 116 of the assignment optimizer 102 of FIG. 1 may be configured to receive such an assignment request. For example, the assignment request may be received at a time prior to a relevant availability of the plurality of resources to the plurality of assignees. For example, where the resources include classes or tasks to be undertaken by assigned ones of the assignees, the assignment request may be received prior to a start date of the classes/tasks, but after receipt of relevant information characterizing the classes/tasks.

A resource database may be accessed to retrieve the plurality of resources from a plurality of stored research data records (204). For example, the assignment request handler 116 may access the resource database 110 in FIG. 1. As described in detail herein, each resource data record may include relevant data for the corresponding resource, some of which may be necessary or helpful in executing the assignment requests. For example, a resource data record for a class may include a maximum number of students allowed within the class within a relevant academic period (e.g., semester).

An assignee database may be accessed to retrieve the plurality of assignees from a plurality of stored assignee data records (206). For example, the assignment request handler may access the assignee database 108 to obtain the relevant assignee data records. As just referenced with respect to the resource database 110, the assignee database 108 may similarly include, within each assignee data record, relevant information for the assignee, some of which may be necessary or helpful in executing the assignment request. For example, in the case of class assignments, the assignee data record may include qualifications or prerequisites that may be necessary for the relevant assignee to be eligible to attend the class in question, or otherwise to be permitted to be assigned to one or more of the plurality of resources.

A ranked selection database may be accessed to retrieve, for each assignee, a ranking for each ranked resource of a ranked subset of the resources (208). For example, the assignment request handler 116 may be configured to access the ranked selection database 112 to determine, for each assignee, a relative ranking for at least some of the plurality of resources associated with the assignment request. As described in detail below, it is not necessary that each assignee provide a ranking for each resource of the plurality of resources. For example, if the resources include a large number of potential/available classes or other resources, each assignee may nonetheless be associated with a ranked subset of the plurality of resources in which, e.g., a smaller number of the resources are assigned a ranking.

Consequently, in some implementations, the assignment request handler 116 may utilize the ranked resources of the various assignees when accessing one or both of the resource database 110 and/or the assignee database 108. For example, upon receipt of the plurality of resources specified within the assignment request, the assignment request handler 116 may retrieve only those assignees associated with a ranked selection of at least one of the resources of the plurality of resources. Similarly, but conversely, upon receipt of the plurality of assignees, the assignment request handler 116 may then retrieve, from the resource database 110, all available resources that have been ranked by at least one of the assignees.

An initial resource assignment may be generated based on an assignee priority value of each assignee and rankings of the ranked subsets (210). For example, as referenced above and described in detail below, each assignee may be assigned a priority value, e.g., using the priority generator 124, so that each resource assignment may be conducted in accordance with a corresponding priority value. During initial operations of a given resource assignment, various techniques may be utilized to assign or initialize the priority values. For example, in some implementations, the priority values may initially be assigned randomly. In other implementations, priority values may be assigned based on seniority, on remaining priority values assigned during previous resource assignments, or on a first-come, first serve basis in which assignees who register earlier are provided higher priorities than those who register later.

Iterations may then be executed to improve the initial resource assignment (212). For example, the iteration controller 120 may be configured to iterate over a plurality of rounds of assignments of individual assignees to individual resources, including dynamically updating one or more of the priority values of the plurality of assignees.

In particular, an optimization value may be determined for each assignee, based on a preceding iteration (212A). For example, the optimization value generator 122 of FIG. 1 may be configured to calculate a satisfaction or dissatisfaction value to be associated with each assignee as the optimization value. As described in detail below, the level of assignee satisfaction or dissatisfaction may be determined or calculated to be proportional to, for example, a number of executed iterations that occur in which the assignee in question fails to receive at least one ranked resource from the ranked subset of resources for that assignee.

The assignee priority value for each assignee may then be updated, based on the corresponding optimization value (212B). For example, the priority generator 124 may update each assignee priority value, based on the satisfaction/dissatisfaction represented by the corresponding optimization value. The assignee priority value for a given assignee may also be updated according to various other criteria, some of examples of which are provided below.

A round of resource assignments among the assignees may be executed, based on the rankings and on the updated priority values (212C). For example, the iteration controller 120 may proceed to assign individual resources to individual assignees, based on the rankings and priority values of the various assignees. For example, assignees with the highest or best priority values will be assigned to resources ranked most highly by the prioritized assignees. Afterwards, if resources remain to be assigned, then the next-most highly prioritized assignees will be assigned to their respective ranked resources.

The iterations may be stopped at a final iteration associated with an iteration stop condition, to thereby obtain the resource assignment (214). For example, the iteration stop condition may include a reaching of a maximum capacity of assignees for at least one (or a specified number or percentage of, or a total number of) the plurality of resources. Of course, various stop conditions may be used, including combinations of two or more thereof. For example, iterations may be halted if all assignees receive all of their respective ranked resources, or if a specified time limit or number of iterations is reached.

Thus, it will be appreciated that the system 100 of FIG. 1, and various implementations thereof, may be configured to execute resource assignments among a plurality of designated assignees in a balanced and dynamic manner, which takes into account a satisfaction level or other metric associated with the resource assignment. The system 100 may be utilized to execute single round and multi round assignments, utilizing the dynamically-updated priority values for each assignee, including raising or lowering a priority value for each assignee during each round of resource assignment. The system 100 thus may be understood to implement a greedy algorithm that is fast and flexible, and that does not require significant computational resources to obtain a desired result, even when a number of assignees and/or resources are high, and even when a number of potential complex exists (e.g., such as when a significant percentage of the plurality of assignees assign a highest-possible ranking to a single resource).

Figure 3:
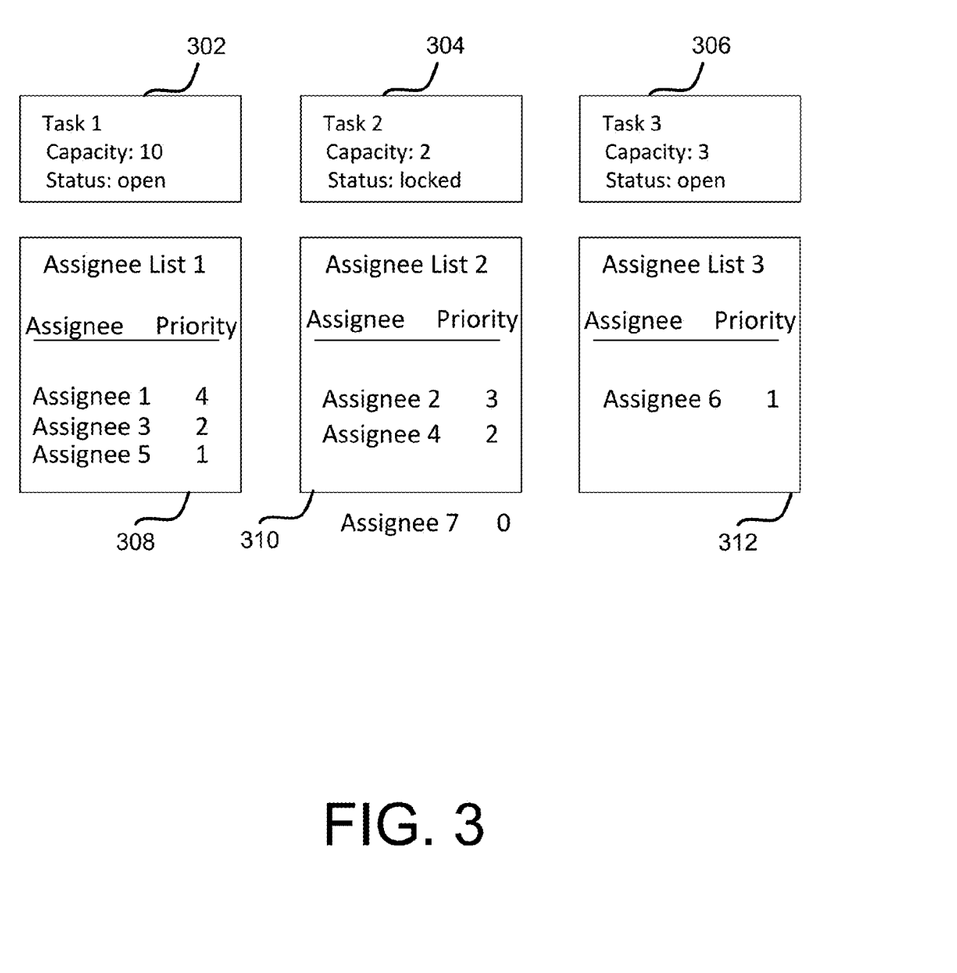
FIG. 3 is a block diagram illustrating a current round of an ongoing resource assignment process according to FIG. 1.

FIG. 3 is a block diagram illustrating a current round of an ongoing resource assignment process according to FIG. 1. In the example of FIG. 3, a first task 302 represents a resource data record that might be stored using the resource database 110 of FIG. 1. Similarly, the tasks 304/306 of FIG. 3 also illustrate example representations of individual resource data records. As shown, each of the tasks 302-306 includes information regarding a capacity and status of the corresponding task.

Meanwhile, the task resource 302 is illustrated as being associated with an assignee list 308, which lists a current set of assignees assigned thereto. Similarly, as shown, an assignee list 310 illustrates assignees assigned to the task resource 304, and an assignee list 312 illustrates an assignee assigned to the task resource 306.

In the simplified example of FIG. 3, it is assumed that each of the task resources 302, 304, 306 have been ranked in an order of first, second, and third preference for or by each of the seven illustrated assignees, and that each of the seven assignees is associated with a corresponding priority value, e.g., as determined from earlier resource assignments, or during initialization procedures.

As illustrated, a first selection of each assignee may be processed by taking, for each task 302-306, an assignee list that is filled according to the first selection of each assignee. As shown, assignees with higher priority values are assigned first during the initial assignment round, such as assignment of the assignee 1 having a priority value 4 to the assignee list 308 for the task resource 302, followed by assignment of the assignee 2 having a priority value 3 to the assignee list 310 for the task resource 304. It will be noted that, in the example of FIG. 3, higher values for the priority values are associated with higher numerical values to be consistent with the examples and techniques provided below, but that it would also be possible to correlate higher priority values with lower numerical values, if preferred.

During the first round, if the total list of assignees includes more assignees than resources that are available, the assignees will be filtered according to their respective priority values. If a task resource reaches its capacity, then the status of the task resource will be changed from open to closed/locked, as in the example of the task resource 304, and it will not be possible to add a subsequent assignee that would otherwise exceed the locked capacity (such as in the example of the assignee 7 of the assignee list 310).

After a first round of assignments is completed, a corresponding optimization value and associated priority value may be determined for each remaining assignee. The second or other subsequent round of resource assignment will then be based on selection of each remaining assignee according to the relevant rankings of that assignee, and in conjunction with the newly-updated priority of the assignee.

In more detail for FIG. 3, for the three tasks 302-306 in the 7 assignees 1-7, during an n-th round of resource assignment, the n-th ranked selection of each assignee will be loaded. That is, in the first round, the first ranked selection will be loaded, the second ranked selection will be loaded for the second round, and so on. In the example, as already referenced above and illustrated in FIG. 3, assignees 1, 3, and 5 have ranked the task 302 most highly, while the assignees 2, 4, and 7 have ranked the task 304 most highly, and the assignee 6 has ranked the task 306 most highly. The assignees are able to be assigned to each of their most highly-ranked resource selections, except that, as already referenced, the assignee 7 is associated with a priority value lower than both the priority values of the assignees 2, 4, so that the assignees 2, 4 are assigned first to the task 304 and reach the capacity for the task 304. If necessary or desired, it would then be possible to output the results of the n-th-round of resource assignments, e.g., utilizing the assignment optimizer UI 106.

Figure 4:
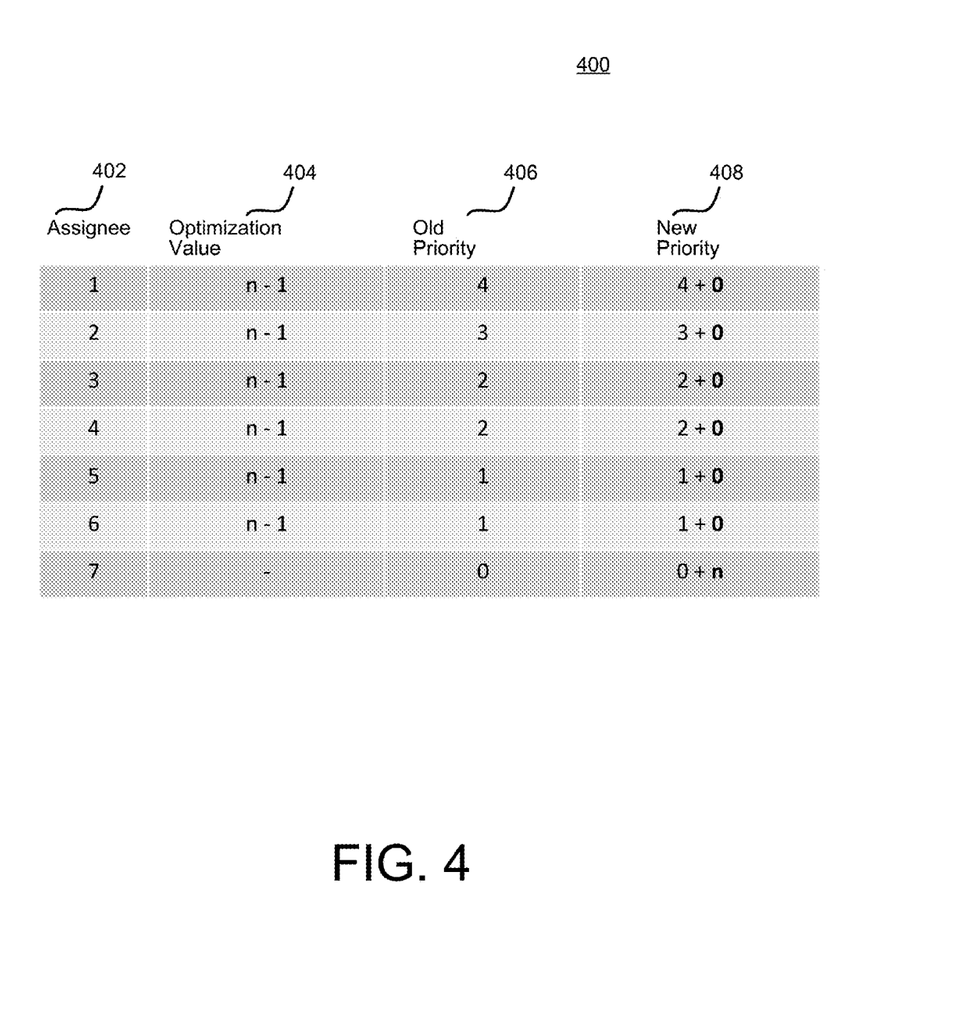
FIG. 4 is a table illustrating dynamic priority updating during an ongoing task assignment process according to FIG. 1.

Following the n-th round of resource assignment in the example of FIG. 3, corresponding optimization values and priority values may be updated, as illustrated in the simplified example of FIG. 4. In particular, as shown, the table 400 of FIG. 4 includes a column 402 listing the various assignees, a column 404 indicating a quantified dissatisfaction of each assignee as an example of the optimization value. A column 406 includes a previous priority value of each assignee of the same row, while a column 408 indicates a new or updated priority value for each assignee, based on the results of the preceding round of resource assignments.

As may be observed from the example of FIG. 4, as each assignment round is completed a value of N will increase, corresponding with an increase in the dissatisfaction/optimization value of the column 404. As also shown in FIG. 4, assignees provided with their requested resource will be associated with a different adjustment to a corresponding dissatisfaction/new priority level than an assignee who does not receive his or her preferred selection.

For example, as already described, in the example of FIG. 3, the assignees 1-6 all received their selected task during the first round of assignment, i.e., n=1. Accordingly, as shown in column 404, a dissatisfaction level for each of the assignees 1-6 will be equivalent to 1−1=0, so that the old priority of the column 406 is updated as the new priority of column 408 by adding a value of 0 (i.e., the priority values do not change).

On the other hand, for the assignee 7, the dissatisfaction value will be increased using one or more of a plurality of available techniques. For example, the new priority value may simply be entered as the old priority value of the column 406, plus the value n of the current iterative round. Additionally, or alternatively, the new priority may also be based on a predesignated value, where the predesignated value may differ depending on the circumstances. For example, the new priority of the assignee 7 may be increased by a larger amount when the assignee 7 fails to receive his or her highest-ranked selection, as compared to a scenario in which the assignee 7 fails to receive his or her lowest-ranked selection. Similarly, the extent of the adjustment of the new priority value may be increased when the assignee fails to receive his or her preferred selection over the course of two or more assignment rounds.

In the examples of FIGS. 1-4, data for the resource repository 104 may be stored in the JavaScript Object Notation (JSON) format. Then, data may be retrieved using an appropriate application program interface (API), Java software development kit (JSDK), or Java Database Connectivity (JDBC).

For example, a ranked selection of the ranked selection database 112 may be stored using the following format of Pseudocode 1:

```
{
   "Ranked Selection": [
      {"JobID":"C098",
      "ValidatePeorid":"2016-4-1 2016-8-1",
      "AppliantID":"I015",
      "Rank":"3"}
   ]
}
```

Pseudocode 1

A task of the resource database 110 may be stored using the following format of Pseudocode 2:

```
{
   "Task": [
      {"JobID":"C098",
      "Description":"SwimmingCourse",
      "ValidatePeorid":"2016-4-1 2016-8-1",
      "Capacity":"12",
      "AssigneeList": {"I001", "I508"}
      "Status":"open"}
   ]
}
```

Pseudocode 2

A priority value of the priority database 114 may be stored using the following format of Pseudocode 3:

```
{
   "Priority": [
      {"JobID":"C098",
      "AppliantID":"I015",
      "Priority":"2"}
   ]
}
```

Pseudocode 3

Figure 5:
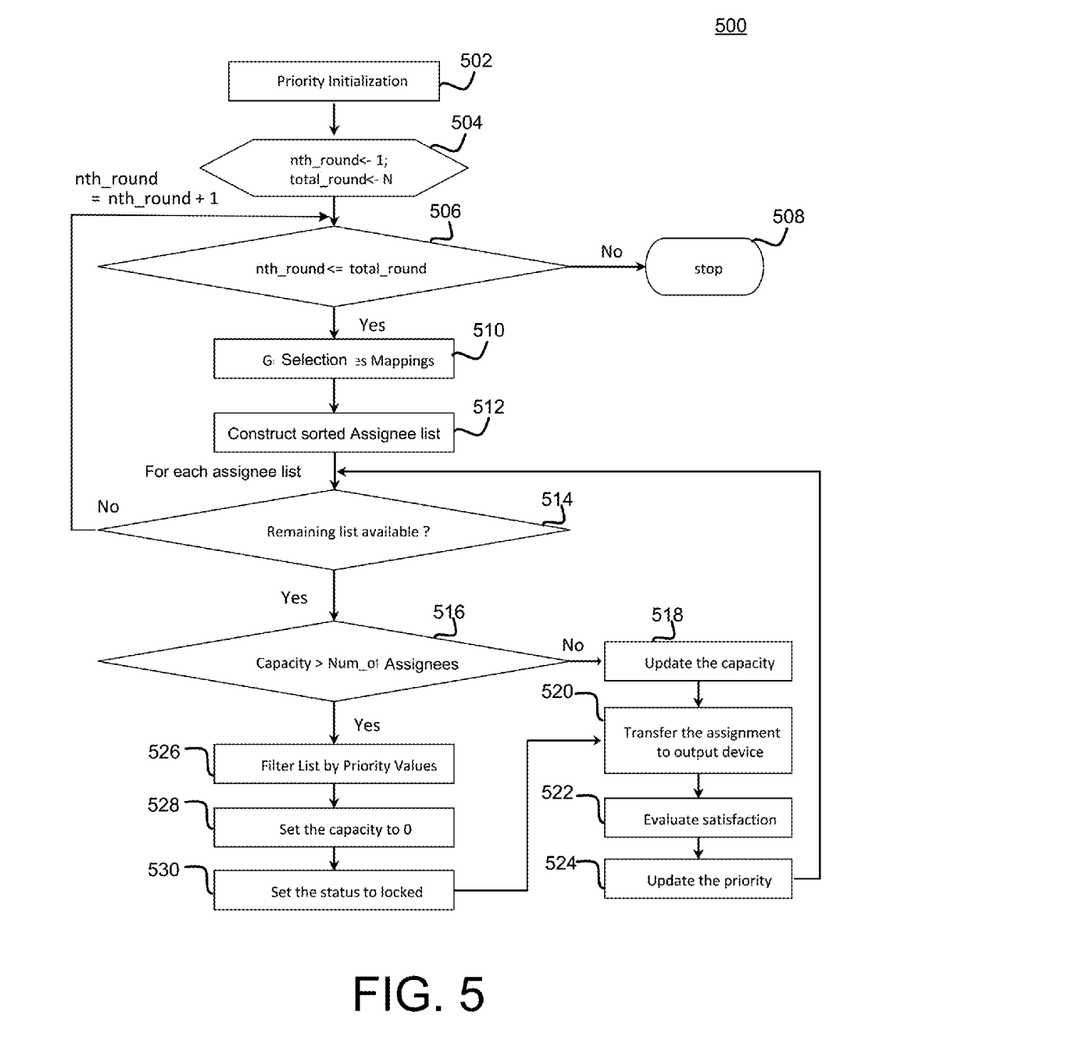
FIG. 5 is a flowchart illustrating more detailed example implementations of the system of FIG. 1.

FIG. 5 is a flowchart 500 illustrating more detailed example operations of the system 100 of FIG. 1, such as may be used in conjunction with the example of FIG. 3 and FIG. 4. In the example of FIG. 5, initial priority values may be set for each assignee (502). For example, an initial priority value may be equal for each assignee (e.g., priority value is 0 for each assignee). In other implementations, priorities may be assigned randomly, or based on earlier resource assignments, or based on other criteria, (e.g., seniority).

If the current n-th round is at or between the first round and a total number of rounds N (504), then the current, n-th round may be compared to the total number of rounds desired (506). If the n-th round is not less than or equal to the total number of rounds, then the process will stop (508). Otherwise, the relevant, n-th ranked selection mapping between assignees and resources may be retrieved (510). That is, where n=1, the first ranked selection will be retrieved, where n=2, the second-ranked selection will be retrieved for each assignee, and so on.

The relevant assignee list, sorted by their current priority values, may then be constructed (512). At this point in the process, since the assignee list has just been constructed and sorted, all of the listed assignees remain available (514).

Similarly, during the first round, it may be assumed that the available capacity for the one or more corresponding resources will exceed the number of assignees (516), so that the assignee being assigned will cause the current capacity of the resource to be updated (518). That is, the new capacity will be updated to equal the old capacity minus the number of assignees in the list being assigned to that resource. If desired, the resulting resource assignment may then be transferred to the assignment optimizer UI 106 for display (520).

The corresponding satisfaction/dissatisfaction as an example of the optimization value may then be determined (522). For example, in the examples of FIGS. 3-4, a dissatisfaction of each assignee in the list may be updated to a value equal to n−1, and the corresponding priority value for that assignee may also be updated (524). In other words, the above-described processes 516-524 reflect the handling of the assignees 1-6 in the example of FIGS. 3-4.

On the other hand, as described and illustrated above with respect to the assignee 7, if the available capacity of the resource is exceeded by the number of assignees in the assignee list, then the assignee list must be filtered by the priority values (526), so that only those assignees having the highest priority values will be assigned to the resource in question. Afterwards, the capacity for the resource will be set to zero (528) and a status of the resource will be set to "locked" (530). Afterwards, as shown, again the resulting resource assignment may be transferred for output (520), and the new satisfaction/optimization values for the filtered assignees will be calculated differently than those for the successfully assigned assignees. For example, the value may be set to a default value that is numerically large relative to the current round n.

It is also possible to calculate an aggregate level of satisfaction/dissatisfaction for the various assignees, thereby providing a metric for an overall success of the process, simply by adding the individual values for the optimization value. This metric could possibly be used to modify the ongoing iterations. For example, if the satisfaction level is low overall, an alternate method for updating the priority values may be used.

For example, in the preceding types of scenarios, or during any time that an operator wishes to make additional or alternative modifications to priority update techniques, it is possible to simply assign on or more new priority calculations. For example, additional rules may be added. For example, a rule may be added stating that two (or some other constant) successive increases in dissatisfaction for an assignee will result in a designated extra increase in priority value for that assignee (e.g., increase of a value of ten). Or, conversely, two (or some other constant) successive increases in satisfaction for an assignee will result in a designated extra decrease in priority value for that assignee (e.g., decrease of a value of ten).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
   receive an assignment request for generating a resource assignment in which a plurality of assignees are assigned to a plurality of resources;
   access a resource database to retrieve the plurality of resources from a plurality of stored resource data records;
   access an assignee database to retrieve the plurality of assignees from a plurality of stored assignee data records;
   access a ranked selection database to retrieve, for each assignee, a ranking for each ranked resource of a ranked subset of the resources;
   generate an initial resource assignment based on an assignee priority value of each assignee and rankings of the ranked subsets;
   execute iterations to improve the initial resource assignment, each current iteration including
       determining an optimization value for each assignee, based on a preceding iteration;
       updating the assignee priority value for each assignee, based on the corresponding optimization value,
       executing a round of resource assignments among the assignees, based on the rankings and on the updated priority values; and
   stop the iterations at a final iteration associated with at least one iteration stop condition, to thereby obtain the resource assignment.

2. The computer program product of claim 1, wherein the plurality of assignees include individuals, and the plurality of resources include instructional classes for which the plurality of individuals are eligible.

3. The computer program product of claim 1, wherein, for the assignment request, each resource is associated with a maximum number of allowable assignees.

4. The computer program product of claim 3, wherein the at least one iteration stop condition includes reaching the maximum number of allowable assignees for at least one of the plurality of resources.

5. The computer program product of claim 1, wherein the assignee priority value for each assignee is initialized randomly prior to the iterations.

6. The computer program product of claim 1, wherein the instructions, when executed by the at least one computing device, are further configured to:
   generate the initial resource assignment based on assignment results of a previous assignment request.

7. The computer program product of claim 1, wherein the instructions, when executed by the at least one computing device, are further configured to:
   calculate the optimization value for each assignee based on a number of iteration rounds in which the corresponding assignee failed to receive an assignment of at least one corresponding ranked resource.

8. The computer program product of claim 1, wherein the instructions, when executed by the at least one computing device, are further configured to:
   calculate an aggregated optimization value for the plurality of assignees.

9. The computer program product of claim 1, wherein the instructions, when executed by the at least one computing device, are further configured to:
calculate the updated priority value for a subsequent iteration including adding the optimization value of the current iteration to a current priority value of the current iteration.

10. A method of executing instructions stored on a non-transitory computer-readable storage medium using at least one processor, the method comprising:
receiving an assignment request for generating a resource assignment in which a plurality of assignees are assigned to a plurality of resources;
accessing a resource database to retrieve the plurality of resources from a plurality of stored resource data records;
accessing an assignee database to retrieve the plurality of assignees from a plurality of stored assignee data records;
accessing a ranked selection database to retrieve, for each assignee, a ranking for each ranked resource of a ranked subset of the resources;
generating an initial resource assignment based on an assignee priority value of each assignee and rankings of the ranked subsets;
executing iterations to improve the initial resource assignment, each current iteration including
determining an optimization value for each assignee, based on a preceding iteration;
updating the assignee priority value for each assignee, based on the corresponding optimization value,
executing a round of resource assignments among the assignees, based on the rankings and on the updated priority values; and
stopping the iterations at a final iteration associated with at least one iteration stop condition, to thereby obtain the resource assignment.

11. The method of claim 10, wherein, for the assignment request, each resource is associated with a maximum number of allowable assignees, and further wherein the at least one iteration stop condition includes reaching the maximum number of allowable assignees for at least one of the plurality of resources.

12. The method of claim 10, further comprising:
determining the optimization value for each assignee based on a number of iteration rounds in which the corresponding assignee failed to receive an assignment of at least one corresponding ranked resource.

13. The method of claim 10, further comprising:
determining an aggregated optimization value for the plurality of assignees.

14. The method of claim 10, further comprising:
determining the updated priority value for a subsequent iteration including adding the optimization value of the current iteration to a current priority value of the current iteration.

15. A system comprising:
at least one processor;
a non-transitory computer-readable storage medium storing instructions executable by the at least one processor, the system including
means for accessing a resource database to retrieve a plurality of resources from a plurality of stored resource data records;
means for accessing an assignee database to retrieve a plurality of assignees from a plurality of stored assignee data records;
means for accessing a ranked selection database to retrieve, for each assignee, a ranking for each ranked resource of a ranked subset of the resources;
means for accessing a priority database to retrieve, for each assignee, a corresponding priority value;
means for executing a greedy algorithm to execute an assignment request for generating a resource assignment in which the plurality of assignees are assigned to the plurality of resources, including iteratively assigning each assignee to a corresponding resource based on a corresponding priority value and corresponding ranking, and updating the corresponding priority value for each assignee for use in a subsequent iteration, based on assignment results of a current iteration.

16. The system of claim 15, further comprising:
means for determining an optimization value for each assignee during the current iteration, the optimization value reflecting a level of success achieved by the corresponding assignee in obtaining corresponding ranked resources during the current iteration.

17. The system of claim 16, wherein the update priority value is calculated based on the optimization value.

18. The system of claim 16, wherein the optimization value is calculated for each assignee based on a number of iteration rounds in which the corresponding assignee failed to receive an assignment of at least one corresponding ranked resource.

19. The system of claim 15, wherein, for the assignment request, each resource is associated with a maximum number of allowable assignees, and further wherein at least one iteration stop condition includes reaching the maximum number of allowable assignees for at least one of the plurality of resources.

20. The system of claim 15, wherein the plurality of assignees include individuals, and the plurality of resources include instructional classes for which the plurality of individuals are eligible.

* * * * *